UNITED STATES PATENT OFFICE 2,254,602

ORTHODIHYDROXY AZO DYESTUFFS

Richard Fleischhauer, Frankfort-on-the-Main-Fechenheim, Paul Zervas, Cologne-Muhlheim, and Adolf Müller, Frankfort-on-the-Main-Fechenheim, Germany, assignors to General Aniline & Film Corporation, New York, N. Y., a corporation of Delaware No Drawing. Application February 3, 1940, Serial No. 317,128. In Germany February 18, 1939

4 Claims. (Cl. 260—199)

Our present invention relates to ortho-hydroxy azodyestuffs more particularly to those of the general formula:

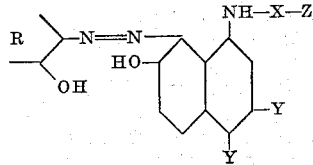

wherein R stands for a radicle of the benzene series, X for a member of the group consisting of —CO— and —$SO_2$—, one Y for hydrogen and the other for the radicle of a sulfonic acid group, Z for a member of the group consisting of alkyl groups, containing more than 2 carbon atoms, alkoxyalkyl, aryloxyalkyl, cycloalkyl, cycloalkyl-alkyl, aralkyl and aryl groups (aryl containing in each case a radicle of the benzene series).

The new dyestuffs are obtained by combining in an alkaline medium ortho-diazophenols not containing a sulfonic acid group with coupling components of the general formula:

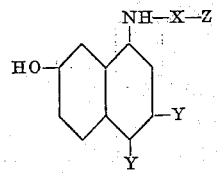

wherein X, Y and Z have the aforesaid signification.

The new dyestuffs yield when chromed on the fiber by the afterchrome or metachrome process valuable grey shades distinguished in comparison with known analogous dyestuffs by a superior fastness particularly to fulling and potting.

In order to further illustrate our invention the following examples are given, the parts being by weight and all temperatures in degrees centigrade.

Example 1

The diazo solution of 14.4 parts of 4-chloro-2-aminophenol is added to a cold solution of 34.3 parts of 1-(benzoylamino)-7-hydroxynaphthalene-3-sulfonic acid, containing an excess of sodium carbonate. After some hours the combination is complete and the dyestuff formed is isolated. It is when dry a blue powder soluble in concentrated sulfuric acid with a violet color. It dyes wool when afterchromed bright bluish grey shades of very good fastness to light, fulling and potting and corresponds with the formula:

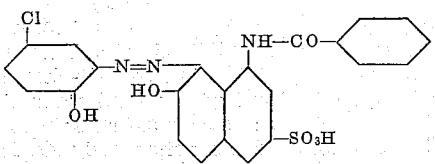

When combining in a like manner the diazocompound of 17.8 parts of 4.6-dichloro-2-aminophenol with 42 parts 1-(2'5'-dichlorobenzoylamino)-7-hydroxynaphthalene-3-sulfonic acid in the presence of an excess of sodium carbonate the formed dyestuff of the formula:

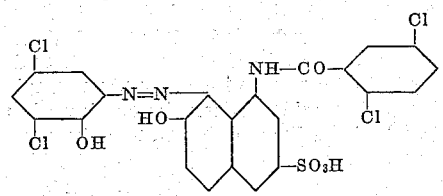

is when dry a dark powder soluble in a sodium carbonate solution with a violet and in concentrated sulfuric acid with a violet-red color and dyes wool claret like red shades turning when afterchromed to a greenish gray of very good fastness to light, fulling and potting.

Example 2

The diazocompound of 16.8 parts of 6-nitro-4-methyl-2-aminophenol is combined with 34.3 parts of 1-benzoylamino-7-hydroxynaphthalene-3-sulfonic acid in the presence of an excess of sodium carbonate. The formed dyestuff of the formula:

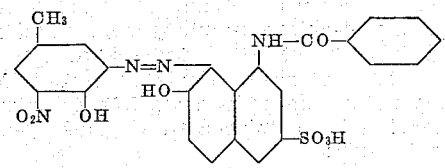

is when dry a chocolate like brown powder soluble in concentrated sulfuric acid with a bluish red color and dyes wool when afterchromed fast bluish gray shades.

When combining the same diazocompound with 1-monochlorobenzoylamino- or 1-dichlorobenzoylamino-7-hydroxynaphthalene-3- or -4-sulfonic acids the formed dyestuffs dye wool when afterchromed similar fast bluish gray shades.

Example 3

The diazocompound of 15.4 parts of 5-nitro-2-aminophenol is combined in the presence of an excess of sodium carbonate with 39.3 parts of 1-(4-toluenesulfonylamino)-7-hydroxynaphthalene-3-sulfonic acid. The formed dyestuff of the formula:

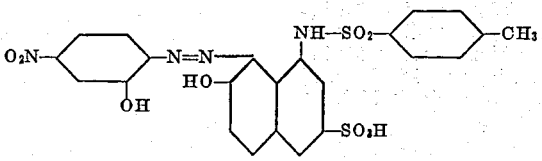

is when dry a dark blue powder soluble in concentrated sulfuric acid with a reddish violet color and dyes wool when afterchromed bright greenish gray shades of very good fastness properties.

When using as coupling component the 1-benzenesulfonylamino- or 1-(4'-chlorobenzenesulfonylamino-) or 1-(3'4'-dichlorobenzenesulfonylamino-) or 1-(2'5'-dimethyl-4'-chlorobenzenesulfonylamino)-7-hydroxynapthalene-3- or -4-sulfonic acid or as diazocomponent the 5-nitro-4-chloro-2-diazophenol dyestuffs are obtained which dye wool when afterchromed similar greenish gray shades of very good fastness properties.

Example 4

17.8 parts of 4.6-dichloro-2-aminophenol are diazotized in the usual manner and the diazocompound is salted out and filtered off. The paste thus obtained is added to a solution containing an excess of sodium carbonate and 31.9 parts of 1-(n-butyrylamino)-7-hydroxynaphthalene-3-sulfonic acid. When the combination has been finished the formed dyestuff of the formula:

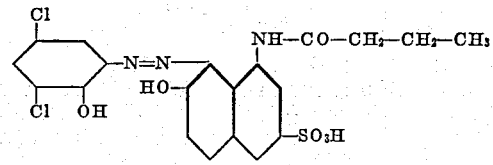

is isolated.

It is when dry a blue powder, soluble in a sodium carbonate solution with a reddish blue color, in dilute acids with a red color and in concentrated sulfuric acid with a bluish red color and dyes wool from an acetic acid bath violet shades turning when after-chromed to a bluish gray of very good fastness properties.

Example 5

The diazosuspension obtained by starting from 14.4 parts of 4-chloro-2-aminophenol is added to a solution of 35.1 of 1-(n-butoxyacetyl)amino-7-hydroxynaphthalene-3-sulfonic acid containing an excess of sodium carbonate. When the combination has been finished the formed dyestuff of the formula:

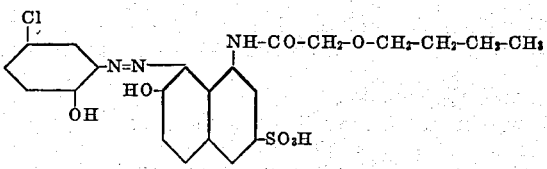

is isolated. It is when a dry violet powder soluble in a sodium carbonate solution with a bluish red color, in concentrated sulfuric acid with a reddish violet color and dyes wool claret like shades turning when afterchromed to a bluish gray of a very good fastness particularly to fulling and potting When combining the diazocompound of 4.6-dichloro-2-aminophenol with 1-phenoxyacetylamino-7-hydroxynaphthalene-3-sulfonic acid in the presence of an excess of sodium carbonate the formed dyestuff of the formula:

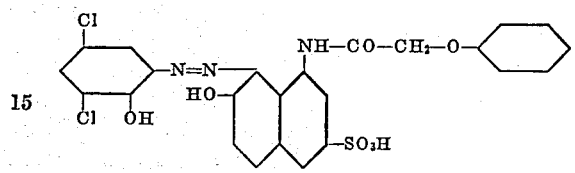

is when dry a watersoluble powder, soluble in concentrated sulfuric acid with a bluish red color and dyes wool violet shades turning when afterchromed to a bluish gray of a very good fastness to light, fulling and potting.

Similar dyestuffs are obtained when using as coupling component the 1-(2'- or 4'-methylphenoxyacetyl)amino- or 1-(2'-chlorophenoxyacetyl)amino-7-hydroxynaphthalene-3-sulfonic acid.

The corresponding dyestuffs derived from 1-(n-butoxyacetyl)amino- and 1-(phenoxyacetyl)-amino-7-hydroxynapththalene-4-sulfonic acid yield shades when afterchromed of somewhat more reddish gray tint.

Example 6

The combination of the diazocompound of 14.4 parts of 6-chloro-2-aminophenol with 36.3 parts of 1-(cyclohexylacetyl)-amino-7-hydroxynaphthalene-3-sulfonic acid in the presence of an excess of sodium carbonate yields a dyestuff of the formula:

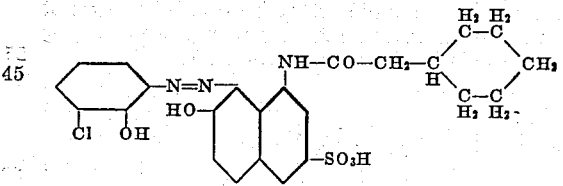

which is when dry a violet powder soluble in a sodium carbonate solution with a reddish blue color, in dilute acids with a red color and dyes wool dark red shades turning to a reddish blue-gray of very good fastness, particularly to fulling, potting and light.

When combining in a similar manner 4-chloro-2-diazophenol with 1-(cyclohexylpropionyl)-amino-7-hydroxynaphthalene-3-sulfonic acid the formed dyestuff of the formula:

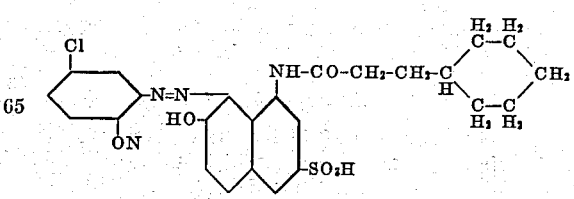

is soluble in concentrated sulfuric acid with a bluish red color and dyes wool claret like red shades turning when afterchromed to a gray of a very good fastness particularly to light, fulling and potting.

Further dyestuffs obtainable according to the present invention are indicated in the following table:

when afterchromed to a greenish gray of very good fastness to light, fulling and potting.

| Diazocomponent | Coupling component | Coloration of the solution of the formed dyestuff in— | | Shade of the dyeing when after-chromed on wool |
|---|---|---|---|---|
| | | Concentrated sulfuric acid | Sodium carbonate solution | |
| 4.6-dichloro-2-aminophenol | 1-(3'-aminobenzoyl)-amino-7-hydroxynaphthalene-3-sulfonic acid. | Bluish red | Violet | Greenish gray. |
| Do | 1-(4'-aminobenzoyl)-amino-7-hydroxynaphthalene-3-sulfonic acid. | ___do___ | ___do___ | Do. |
| Do | 1-(phenoxyacetyl-amino)-7-hydroxynaphthalene-4-sulfonic acid. | ___do___ | Reddish blue | Gray. |
| 4-chloro-2-aminophenol | 1-hexahydrobenzoylamino-7-hydroxynaphthalene-3-sulfonic acid. | Claret like red | Violet | Greenish gray. |
| Do | 1-(cyclohexylacetyl)-amino-7-hydroxynaphthalin-3-sulfonic acid. | Bluish red | ___do___ | Gray. |
| Do | 1-(phenylacetyl)-amino-7-hydroxynaphthalene-4-sulfonic acid. | ___do___ | Bluish violet | Reddish gray. |
| 6-chloro-2-aminophenol | 1-(n-butyrylamino)-7-hydroxynaphthalene-3-sulfonic acid. | Red | Reddish blue | Do. |
| Do | 1-(3'-aminobenzoyl-amino)-7-hydroxynaphthalene-3-sulfonic acid. | ___do___ | ___do___ | Do. |
| Do | 1-(benzoylamino)-7-hydroxy-naphthalene-3-sulfonic-acid. | ___do___ | ___do___ | Do. |
| Do | 1-(cyclohexylpropionyl)-amino-7-hydroxy-naphthalene-3-sulfonic acid. | ___do___ | ___do___ | Do. |
| Do | 1-(3'-nitrobenzoylamino)-7-hydroxy-naphthalene-3-sulfonic acid. | ___do___ | Violet | Bluish black. |
| Do | 1-(4'-nitrobenzoyl-amino)-7-hydroxy-naphthalene-3-sulfonic acid. | ___do___ | Bluish violet | Do. |
| 4-methyl-6-nitro-2-aminophenol | 1-(n-butoxyacetyl-amino)-7-hydroxy-naphthalene-3-sulfonic acid. | Bluish red | Blue | Gray. |
| Do | 1-(phenoxyacetyl-amino)-7-hydroxy-naphthalene-3-sulfonic acid. | ___do___ | ___do___ | Do. |
| 4-nitro-2-aminophenol | 1-(n-butoxyacetyl-amino)-7-oxynaphthalene-3-sulfonic acid. | Red | Reddish violet | Olive. |
| 4-chloro-6-nitro-2-aminophenol | ___do___ | Bluish red | Blue | Blue-gray. |
| 6-chloro-4-nitro-2-aminophenol | 1-(n-butoxyacetyl-amino)-7-hydroxynaphthalene-3 sulfonic acid. | Red | Bluish red | Olive-gray. |
| 4.6-dichloro-2-amino-phenol | ___do___ | Bluish red | Violet | Gray. |
| Do | 1-(n-butoxyacetyl-amino)-7-hydroxynaphthalene-4-sulfonic acid. | ___do___ | Reddish blue | Reddish gray. |

We claim:
1. Ortho-dihydroxy azodyestuffs of the general formula:

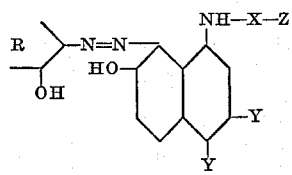

wherein R stands for a radicle of the benzene series, X for a member of the group consisting of —CO— and —SO₂—, one Y for hydrogen and the other for the radicle of a sulfonic acid group, Z for a member of the group consisting of alkyl groups, containing 3 carbon atoms, alkoxy-alkyl, aryloxyalkyl, cycloalkyl, cycloalkyl-alkyl, aralkyl and aryl groups (aryl meaning in each case a radicle of the benzene series), which dyestuffs yield when chromed on the fiber valuable gray shades of very good fastness particularly to fulling and potting.

2. The orthodihydroxy azodyestuff of the formula:

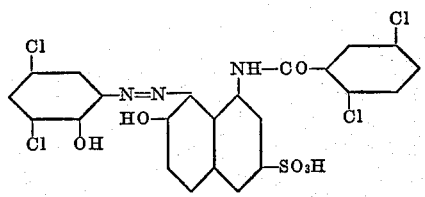

which is when dry a dark powder soluble in a sodium carbonate solution with a violet and in concentrated sulfuric acid with a violet-red color and dyes wool claret like red shades turning 3. The orthodihydroxy azodyestuff of the formula:

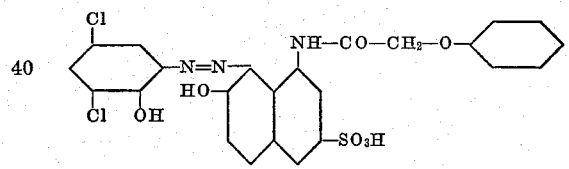

which is when dry a watersoluble powder, soluble in concentrated sulfuric acid with a bluish red color and dyes wool violet shades turning when afterchromed to a bluish gray of a very good fastness to light, fulling and potting.

4. The orthodihydroxy azodyestuff of the formula:

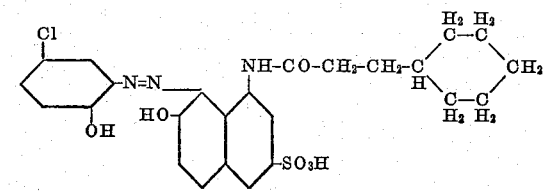

which is soluble in concentrated sulfuric acid with a bluish red color and dyes wool claret like red shades turning when afterchromed to a gray of a very good fastness particularly to light, fulling and potting.

RICHARD FLEISCHHAUER.
PAUL ZERVAS.
ADOLF MÜLLER.